(12) United States Patent
Asai (10) Patent No.: US 11,625,593 B2
(45) Date of Patent: Apr. 11, 2023

(54) FIXED-WEIGHTING-CODE LEARNING DEVICE

(71) Applicant: NATIONAL UNIVERSITY CORPORATION HOKKAIDO UNIVERSITY, Sapporo (JP)

(72) Inventor: Tetsuya Asai, Sapporo (JP)

(73) Assignee: NATIONAL UNIVERSITY CORPORATION HOKKAIDO UNIVERSITY, Sapporo (JP)

( * ) Notice: Subject to any disclaimer, the term of this patent is extended or adjusted under 35 U.S.C. 154(b) by 811 days.

(21) Appl. No.: 16/493,889

(22) PCT Filed: Feb. 13, 2018

(86) PCT No.: PCT/JP2018/004786
§ 371 (c)(1),
(2) Date: Dec. 18, 2019

(87) PCT Pub. No.: WO2018/168293
PCT Pub. Date: Sep. 20, 2018

(65) Prior Publication Data
US 2020/0125940 A1    Apr. 23, 2020

(30) Foreign Application Priority Data

Mar. 14, 2017 (JP) .............................. JP2017-048421

(51) Int. Cl.
*G06N 3/063* (2006.01)
*G06N 3/04* (2006.01)
(Continued)

(52) U.S. Cl.
CPC ............. *G06N 3/0635* (2013.01); *G06N 3/04* (2013.01); *G06N 3/088* (2013.01)

(58) Field of Classification Search
CPC ...... G06N 3/04; G06N 3/0454; G06N 3/0481; G06N 3/0635; G06N 3/088; G06N 3/084
See application file for complete search history.

(56) References Cited

U.S. PATENT DOCUMENTS

2016/0155136 A1* 6/2016 Zhang .................. G06N 3/0454
                                                       705/7.29

FOREIGN PATENT DOCUMENTS

JP         2009-282782 A    12/2009

OTHER PUBLICATIONS

Zamarreño-Ramos, Carlos, et al. "On spike-timing-dependent-plasticity, memristive devices, and building a self-learning visual cortex." Frontiers in neuroscience 5 (2011): 26: 1-22 (Year: 2011).*

(Continued)

*Primary Examiner* — Kamran Afshar
*Assistant Examiner* — Randall K. Baldwin
(74) *Attorney, Agent, or Firm* — Sughrue Mion, PLLC (57) ABSTRACT

A neural network circuit is provided with which it is possible to significantly reduce the area occupied by the connection unit of a full connection (FC)-type neural network circuit. An analog-type neural network circuit constitute a learning apparatus having a self-learning function and corresponding to a brain function, wherein the neural network comprises: a plurality (n) of input-side neurons; a plurality (m, and including cases when n=m) of output-side neurons; (n×m) connection units each connecting one input-side neuron and one output-side neuron; and a self-learning control unit, the (n×m) connection units being constituted from connection units corresponding to only the positive weighting function as a brain function, and connection units corresponding to only the negative weighting function as the brain function.

4 Claims, 3 Drawing Sheets

(51) Int. Cl.
G06N 3/08 (2006.01)
G06N 3/088 (2023.01)

(56) References Cited

OTHER PUBLICATIONS

Kim, Hyongsuk, et al. "Neural synaptic weighting with a pulse-based memristor circuit." IEEE Transactions on Circuits and Systems I: Regular Papers 59.1 (2011): 148-158. (Year: 2011).*

Alibart, Fabien, Elham Zamanidoost, and Dmitri B. Strukov. "Pattern classification by memristive crossbar circuits using ex situ and in situ training." Nature communications 4.1 (2013): 1-7. (Year: 2013).*

Hasan, Raqibul, and Tarek M. Taha. "Enabling back propagation training of memristor crossbar neuromorphic processors." 2014 International Joint Conference on Neural Networks (IJCNN). IEEE, 2014: 21-28 (Year: 2014).*

Sheridan, Patrick, Wen Ma, and Wei Lu. "Pattern recognition with memristor networks." 2014 IEEE International Symposium on Circuits and Systems (ISCAS). IEEE, 2014: 1078-1081 (Year: 2014).*

Yakopcic, Chris, Md Zahangir Alom, and Tarek M. Taha. "Memristor crossbar deep network implementation based on a convolutional neural network." 2016 International joint conference on neural networks (IJCNN). IEEE, 2016: 963-970 (Year: 2016).*

Zhang, Peijian, et al. "Forgetting memristor based neuromorphic system for pattern training and recognition." Neurocomputing 222 (2017): 47-53. (Year: 2016).*

Shafiee, Ali, et al. "ISAAC: A convolutional neural network accelerator with in-situ analog arithmetic in crossbars." ACM SIGARCH Computer Architecture News 44.3 (2016): 14-26. (Year: 2016).*

Chi, Ping, et al. "Prime: A novel processing-in-memory architecture for neural network computation in reram-based main memory." ACM SIGARCH Computer Architecture News 44.3 (2016): 27-39. (Year: 2016).*

Nair, Manu V., and Piotr Dudek. "Gradient-descent-based learning in memristive crossbar arrays." 2015 International Joint Conference on Neural Networks (IJCNN). IEEE, 2015. (Year: 2015).*

Raqibal Hasan et al., "Enabling Back Propagation Training on Memristor Crossbar Neuromorpgic processors", 2014 International Joint Conference on Neural Networks, IEEE, Sep. 4, 2014, 9 pgs.

Chris Yakopcic et al., "Memristor crossbar deep network implementation based on a convolutional neural network", 2016 International Joint Conference on Neural Networks, Nov. 3, 2016, 9.

International Search Report for PCT/JP2018/004786 dated, May 15, 2018.

* cited by examiner

Fig. 1

$$O = F(W_1 \times I_1 + W_2 \times I_2 + \cdots + W_n \times I_n) \cdots (1)$$

FIXED-WEIGHTING-CODE LEARNING DEVICE

TECHNICAL FIELD

The present invention relates to a technical field of a fixed-weighting-sign learning apparatus comprising a neural network circuit, and more specifically to a self-learning-type fixed-weighting-sign learning apparatus comprising an analog-type neural network circuit corresponding to a brain function.

BACKGROUND ART

In recent years, research and development related to a deep learning function (what is called a deep learning function) using a neural network circuit corresponding to a human brain function have been actively carried out. In order to concretely implement the neural network circuit, there is a case in which a digital circuit is used and a case in which an analog circuit is used. Here, the former has a high processing capability, but requires a large-scale hardware configuration and large power consumption, and is used in, for example, a data center or the like. On the other hand, the latter has a processing capability inferior to that of a digital circuit, but can be expected to minimize the hardware configuration and reduce the power consumption, and is frequently used as, for example, a terminal apparatus connected to the aforementioned data center or the like. One of conventional techniques related to the latter is the technique disclosed in, for example, a following Patent Document 1.

Patent Document 1 discloses a full connection (FC) type neural network circuit for deep learning, which is a neural network circuit implemented by an analog circuit (that is, an analog-type neural network circuit) and in which all the input-side neurons and all the output-side neurons are connected in a one-to-one manner at connection units each having a resistance value corresponding to weighting for each connection unit. The weighting in this case is weighting corresponding to a brain function to which the neural network circuit corresponds. In the neural network circuit disclosed in Patent Document 1, the resistance value of each connection unit configured by a variable resistance element corresponds to the weighting. Such an FC-type neural network circuit can be used as, for example, a neural network circuit of another type, such as a neighborhood coupling type, or a part of a larger scale neural network circuit, and it is desired to further improve the processing capability of itself and to reduce the circuit scale (occupied area).

CITATION LIST

Patent Document

Patent Document 1: JP 2009-282782 A (FIGS. 1, 3, etc.)

DISCLOSURE OF INVENTION

Problems to be Solved by the Invention

Here, in order to make the function of the aforementioned neural network circuit closer to the brain function, in general, it is necessary to use negative weighting in addition to positive weighting as the aforementioned weighting. On the other hand, the resistance value at the aforementioned connection unit is constant (that is, the resistance value is fixed) at each connection unit. Thus, if both the aforementioned positive weighting and the negative weighting are achieved by such a connection unit, it is necessary to divide an input signal equivalent to input data corresponding to one input-side neuron into a positive input signal and a negative input signal that have the same absolute value, and to selectively input these two input signals to two resistances having the same resistance value. At this time, the aforementioned "to selectively input" means to input only a positive input signal in a case in which positive weighting is performed, and to input only a negative input signal in a case in which negative weighting is performed. Note that, if positive weighting is performed, the resistance for a negative input signal is not used eventually, and if negative weighting is performed, an offer for a positive input signal is not used eventually. However, whether to perform positive weighting or negative weighting changes for each neural network circuit depending on the corresponding brain function. Thus, in order to achieve versatility as a circuit, it is necessary to create the aforementioned two resistances in advance for each connection unit that connects one input-side neuron to one output-side neuron. In this case, one connection unit is constituted by the two resistances, and this causes a problem that the circuit scale (occupied area) as connection units is consequently doubled, and the occupied area cannot be reduced.

This problem leads another serious problem that, in an FC-type neural network circuit that requires the number of connection units obtained by multiplying the number of input-side neurons by the number of output-side neurons, the occupied area is further increased as the number of connection units is increased.

For this reason, the present invention has been made in view of each of the aforementioned problems, and one example of its object is to provide a self-learning-type fixed-weighting-sign learning apparatus that can significantly reduce the area occupied by connection units in an FC-type neural network circuit.

Solutions to the Problems

In order to solve the above problems, an invention according to claim 1 is characterized a self-learning-type fixed-weighting-sign learning apparatus comprising: an analog-type neural network circuit corresponding to a brain function, wherein the neural network circuit comprises: a plurality of (n) input units each configured to receive an input signal equivalent to input data; a plurality of (m, and n=m is included) output units each configured to output an output signal equivalent to output data; and (n×m) connection units each configured to connect one of the input units to one of the output units, and the fixed-weighting-sign learning apparatus further comprises a control means that controls the fixed-weighting-sign learning apparatus in a manner such that data output from the input unit, as a result of re-inputting the output data to the fixed-weighting-sign learning apparatus from the output unit, matches the original input data in order to perform a function of the self-learning, and the (n×m) connection units comprise: positive-dedicated connection units that are the connection units corresponding only to a positive weighting function as the brain function; and negative-dedicated connection units that are the connection units corresponding only to a negative weighting function as the brain function.

The invention according to claim 1 comprises n input units, m output units, (n×m) connection units, and a control means that performs a self-learning function, and the (n×m) connection units are constituted by positive-dedicated connection units and negative-dedicated connection units. Thus, since the connection units are each constituted by the positive-dedicated connection units and the negative-dedicated connection units, it is possible to significantly reduce the area occupied by the connection units in the neural network circuit.

In order to solve the above problems, an invention according to claim 2 is the fixed-weighting-sign learning apparatus according to claim 1, wherein the number of the positive-dedicated connection units and the number of the negative-dedicated connection units are the same.

According to the invention described in claim 2, in addition to the effect of the invention described in claim 1, since the number of the positive-dedicated connection units and the number of the negative-dedicated connection units are the same, it is possible to significantly reduce the area occupied by the connection units while the learning capability as the fixed-weighting-sign learning apparatus is improved.

In order to solve the above problems, an invention according to claim 3 is the fixed-weighting-sign learning apparatus according to claim 1 or 2, wherein the positive-dedicated connection units and the negative-dedicated connection units are uniformly randomly distributed in the (n×m) connection units.

According to the invention described in claim 3, in addition to the effect of the invention described in claim 1 or 2, since the positive-dedicated connection units and the negative-dedicated connection units are uniformly randomly distributed in the (n×m) connection units, it is possible to significantly reduce the area occupied by the connection units while both the learning capability and the generalization capability similar to the conventional ones are maintained.

In order to solve the above problems, an invention according to claim 4 is the fixed-weighting-sign learning apparatus according to claim 1 or 2, wherein the positive-dedicated connection units and the negative-dedicated connection units are regularly distributed in the (n×m) connection units.

According to the invention described in claim 4, in addition to the effect of the invention described in claim 1 or 2, since the positive-dedicated connection units and the negative-dedicated connection units are regularly distributed in the (n×m) connection units, it is possible to significantly reduce the area occupied by the connection units while both the learning capability similar to the conventional one is maintained.

Effects of the Invention

According to the present invention, n input units, m output units, (n×m) connection units, and a control means that performs a self-learning function are comprised, and the (n×m) connection units are constituted by positive-dedicated connection units and negative-dedicated connection units.

Thus, since the connection units are each constituted by the positive-dedicated connection units and the negative-dedicated connection units, it is possible to significantly reduce the area occupied by the connection units in a self-learning-type fixed-weighting-sign learning apparatus including an analog-type neural network circuit.

EMBODIMENTS FOR CARRYING OUT THE INVENTION

Next, embodiments according to the present invention will be described with reference to the drawings. Note that, each embodiment described below is an embodiment or the like when the present invention is applied to an analog-type neural network circuit that models a human brain function.

(I) First Embodiment

Figure 1:
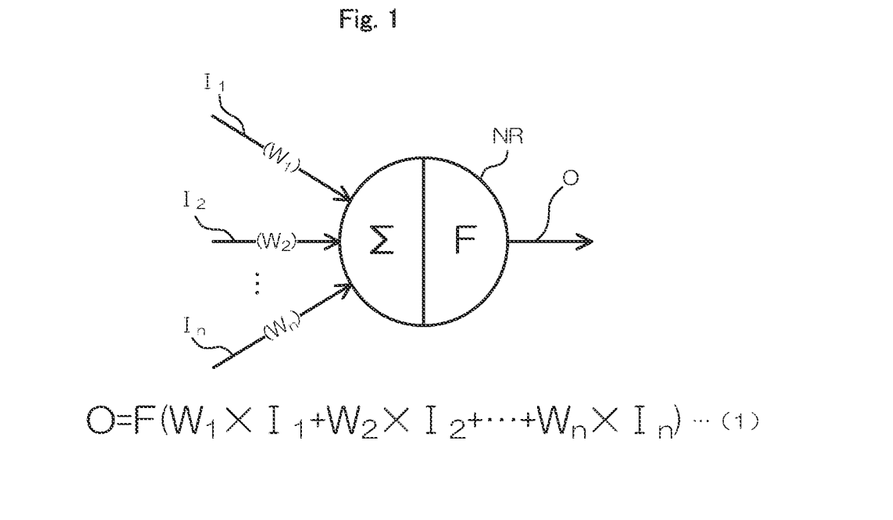
FIG. 1 is a figure indicating a unit that models one neuron.
Figure 2:
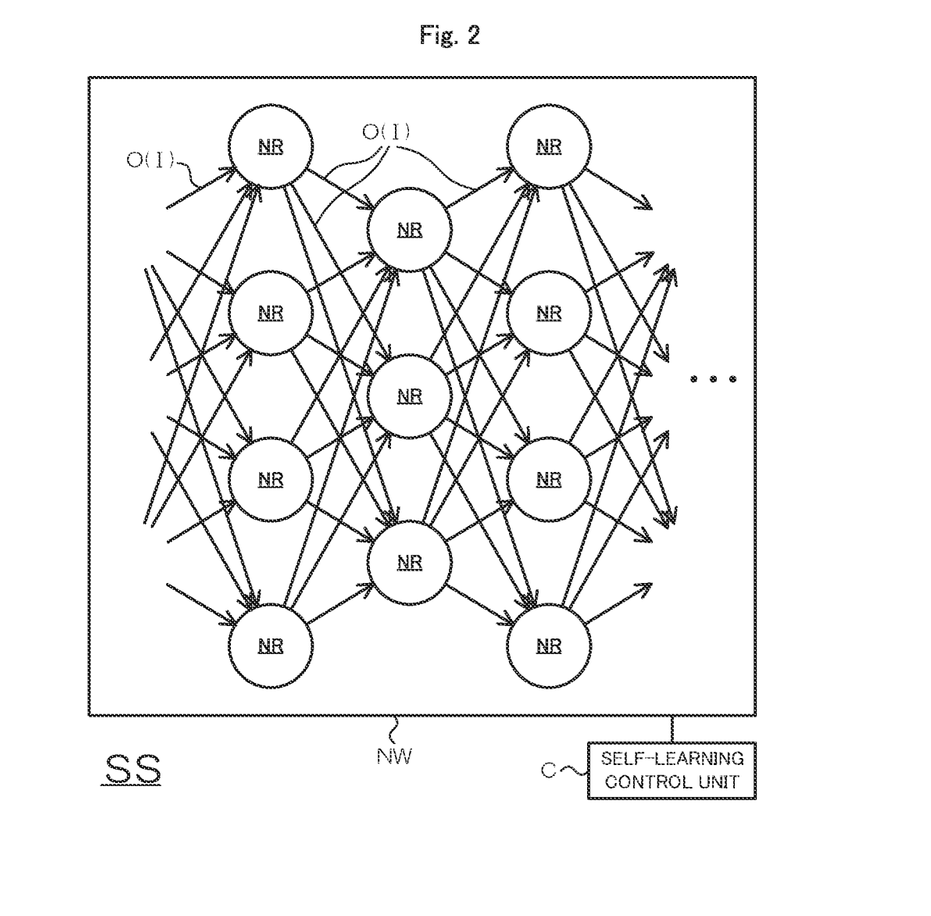
FIG. 2 is a figure indicating a neural network circuit according to a first embodiment.
Figure 3A:
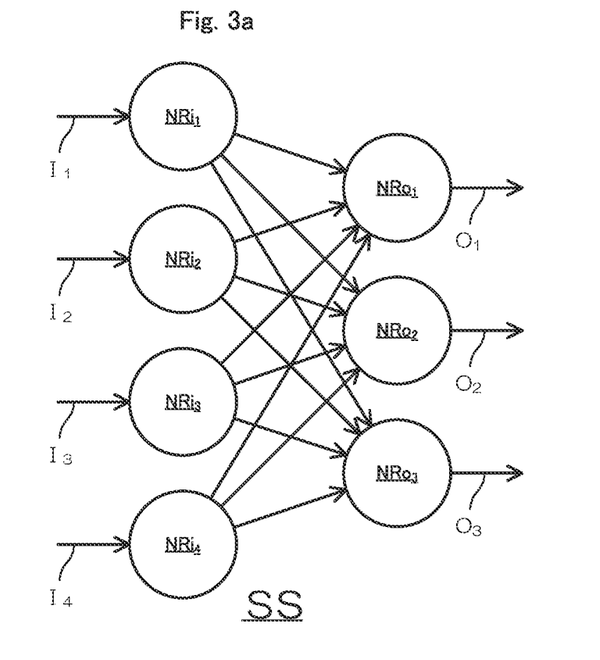
FIG. 3(a) is a figure indicating a part and the like of the neural network circuit according to the first embodiment.
Figure 3B:
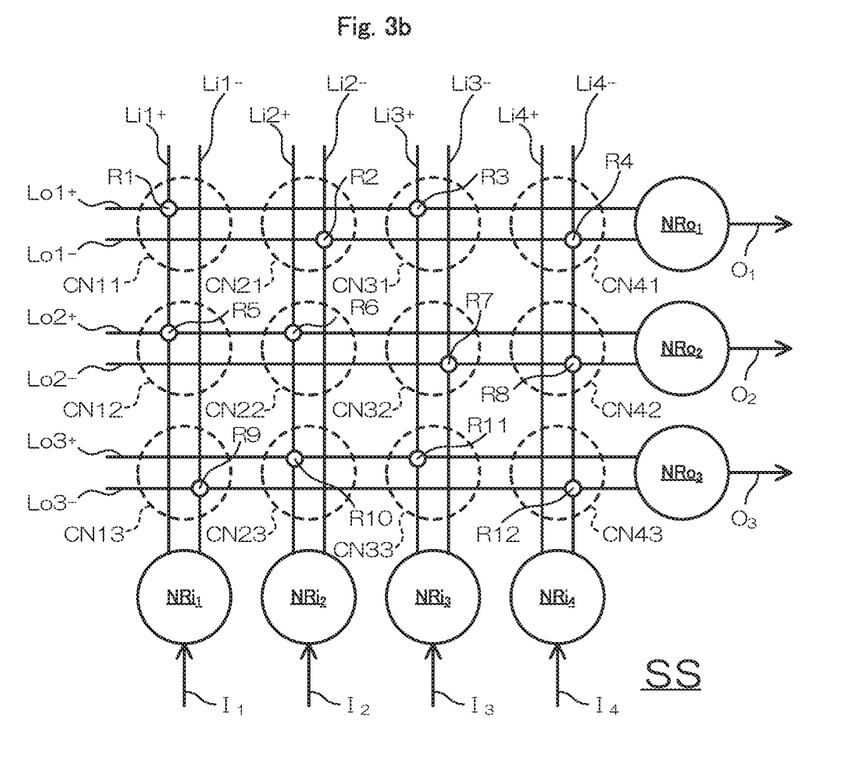
FIG. 3(b) is a figure indicating the neural network circuit when the part is implemented by an analog circuit.

First, a first embodiment according to the present invention will be described with reference to FIGS. 1 to 3. Note that, FIG. 1 is a figure indicating a unit that models one neuron, FIG. 2 is a figure indicating a neural network circuit according to the first embodiment, FIG. 3(a) is a figure indicating a part and the like of the neural network circuit according to the first embodiment, and FIG. 3(b) is a figure indicating the neural network circuit when the part is implemented by an analog circuit.

(A) Regarding Neural Network

First, a neural network that models the aforementioned brain function will be generally described with reference to FIG. 1.

In general, it is said that there are a large number of neurons (nerve cells) in a human brain. Each neuron in the brain receives electrical signals from the large number of the other neurons and transmits electrical signals to the large number of the other neurons. Then, it is said that a brain generally performs various types of information processing with the flows of these electrical signals between the neurons. At this time, transmission/reception of electrical signals between the neurons is performed through cells called synapses. Then, the neural network is what models this transmission/reception of electrical signals between the aforementioned neurons in the brain in order to realize a brain function in a computer.

More specifically, in the neural network, the aforementioned transmission/reception of the electrical signals to one neuron in the brain function is modeled by performing, for a neuron NR as one unit, a multiplication process, an addition process, and an activation-function application process with respect to a plurality of pieces of input data $I_1$, input data $I_2$, . . . , input data $I_n$ (n is a natural number). The same applies hereinafter.) input from the outside, and by representing, as output data O from the neuron NR, the result of the processes, as exemplified in FIG. 1. Note that, in the following description, the aforementioned activation-function application process is simply referred to as an "activation process". At this time, the aforementioned multiplication process is performed for one neuron NR by multiplying the input data $I_1$, the input data $I_2$, . . . , and the input data $I_n$ by a preset (that is, default) weighting coefficient $W_1$, weighting coefficient $W_2$, . . . , and weighting coefficient $W_n$ respectively corresponding to the input data $I_1$, the input data $I_2$, . . . , and the input data $I_n$. Then, the aforementioned addition process for adding the results of the aforementioned multiplication process with respect to each of the input data $I_1$, the input data $I_2$, . . . , and input data $I_n$ is performed for the neuron NR. Then, the aforementioned activation process for applying a predetermined activation function F to the result of the aforementioned addition process is performed, and the result is output to one or more neurons NR as the aforementioned output data O. The above series of multiplication process, addition process, and activation process is expressed by Expression (1) shown in FIG. 1. At this time, the multiplication process for multiplying the input data $I_1$, the input data $I_2$, . . . , and the input data $I_n$ by the weighting coefficient $W_1$, the weighting coefficient $W_2$, . . . , and the weighting coefficient $W_n$ respectively is equivalent to the action of the aforementioned synapses in the aforementioned transmission/reception of electrical signals between the neurons NR.

(B) Regarding the Neural Network Circuit According to the First Embodiment

Next, a neural network circuit SS according to the first embodiment including a plurality of neurons NR exemplified in FIG. 1 will be described with reference to FIG. 2. This neural network circuit SS is equivalent to an example of a "learning apparatus" according to the present invention.

As shown in FIG. 2, a large number of neurons NR (one neuron NR as one unit) exemplified in FIG. 1 is gathered and connected to each other by synapses, and the entire brain is modeled as a neural network NW. Note that, in the following description, when what is common to the input data $I_1$ to the input data $I_n$ is described, they are simply referred to as "input data I". Similarly, when what is common to the output data $O_1$ to the output data $O_n$ is described, they are simply referred to as "output data O". Similarly, when what is common to the weighting coefficients $W_1$ to $W_n$ is described, they are simply referred to as a "weighting coefficient W".

Meanwhile, the neural network circuit SS according to the first embodiment comprises, in addition to the aforementioned neural network NW, a self-learning control unit C that controls a self-learning function in the neural network NW. The self-learning control unit C according to the first embodiment controls the neural network NW so that data output from its input side, as a result of re-inputting the output data as the entire neural network NW to the neural network NW from its output side, matches the original input data I, in order to perform the self-learning function as the neural network circuit SS. The self-learning control unit C is equivalent to an example of a "control means" according to the present invention.

Next, a configuration of a part of the neural network circuit SS according to the first embodiment implemented by an analog-type neural network circuit will be described with reference to FIG. 3. Note that, in the following description, with reference to a part of the neural network circuit SS constituted by the seven neurons NR shown in FIG. 3(a), the configuration of the analog-type neural network circuit SS according to the first embodiment will be described. In FIG. 3, the illustration of the self-learning control unit C shown in FIG. 2 is omitted.

At this time, in FIG. 3(a), the input-side neurons $NR_{i1}$ to $NR_{i4}$ to which the input data $I_1$ to $I_4$ are respectively input are mutually connected to the output-side neurons $NR_{o1}$ to $NR_{o3}$ from which the output data $O_1$ to $O_3$ are respectively output. That is, the input-side neuron $NR_{i1}$ is connected to all of the output-side neurons $NR_{o1}$ to $NR_{o3}$, the input-side neuron $NR_{i2}$ is also connected to all of the neurons $NR_{o1}$ to $NR_{o3}$, the input-side neuron $NR_{i3}$ is also connected to all of the neurons $NR_{o1}$ to $NR_{o3}$, and the input side neuron $NR_{i4}$ is also connected to all of the neurons $NR_{o1}$ to $NR_{o3}$. Note that, in the following description, when what is common to the neurons $NR_{i1}$ to $NR_{i4}$ and the neurons $NR_{o1}$ to $NR_{o3}$ is described, they are simply referred to as a "neuron NR".

Then, in FIG. 3(a), the arrows shown between the neurons $NR_{i1}$ to $NR_{i4}$ and the neurons $NR_{o1}$ to $NR_{o3}$ correspond to the aforementioned weighting coefficients W between the neurons NR. Note that, the neurons $NR_{i1}$ to $NR_{i4}$ are equivalent to an example of "input units" according to the present invention, and the neurons $NR_{o1}$ to $NR_{o3}$ are equivalent to an example of "output units" according to the present invention.

Then, as shown in FIG. 3(b), the neural network circuit SS according to the first embodiment comprises four positive voltage lines Li1+ to Li4+, four negative voltage lines Li1− to Li4−, three positive voltage lines Lo1+ to Lo3+, and three negative voltage lines Lo1− to Lo3−. The four positive voltage lines Li1+ to Li4+ are connected to the neurons $NR_{i1}$ to $NR_{i4}$ respectively, and positive voltages corresponding to the input data $I_1$ to input data $I_4$ are applied to the four positive voltage lines Li1+ to Li4+ respectively. The four negative voltage lines Li1+ to Li4+ are connected to the neurons $NR_{i1}$ to $NR_{i4}$ respectively, and negative voltages corresponding to the input data $I_1$ to input data $I_4$ are applied to the four negative voltage lines Li1+ to Li4+ respectively. The three positive voltage lines Lo1+ to Lo3+ are connected to the neurons $NR_{o1}$ to $NR_{o3}$ respectively. The three negative voltage lines Lo1− to Lo3− are connected to the neurons $NR_{o1}$ to $NR_{o3}$ respectively. At this time, the positive voltage lines Li1+ to Li4+, the negative voltage line Li1− to Li4−, the positive voltage line Lo1+ to Lo3+, and the negative voltage line Lo1− to Lo3− are formed in respective separate layers with, for example, photolithography.

$I_n$ FIG. 3(b), a connection unit CN11 that connects the neuron $NR_{o1}$ to the neuron $NR_{o1}$ is formed by the positive voltage line Li1+, the negative voltage line Li1−, the positive voltage line Lo1+, and the negative voltage line Lo1−, a connection unit CN12 that connects the neuron $NR_{i1}$ to the neuron $NR_{i2}$ is formed by the positive voltage line Li1+, the negative voltage line Li1−, the positive voltage line Lo2+, and the negative voltage line Lo2−, and a connection unit CN13 that connects the neuron $NR_{i1}$ to the neuron $NR_{o3}$ is formed by the positive voltage line Li1+, the negative voltage line Li1−, the positive voltage line Lo3+, and the negative voltage line Lo3−. $I_n$ addition, a connection unit CN21 that connects the neuron $NR_{i2}$ to the neuron $NR_{o1}$ is formed by the positive voltage line Li2+, the negative voltage line Li2−, the positive voltage line Lo1+, and the negative voltage line Lo1−, a connection unit CN22 that connects the neuron $NR_{i2}$ to the neuron $NR_{i2}$ is formed by the positive voltage line Li2+, the negative voltage line Li2−, the positive voltage line Lo2+, and the negative voltage line Lo2−, and a connection unit CN23 that connects the neuron $NR_{i2}$ to the neuron $NR_{o3}$ is formed by the positive voltage line Li2+, the negative voltage line Li2−, the positive voltage line Lo3+, and the negative voltage line Lo3−. $I_n$ addition, a connection unit CN31 that connects the neuron $NR_{i3}$ to the neuron $NR_{o1}$ is formed by the positive voltage line Li3+, the negative voltage line Li3−, the positive voltage line Lo1+, and the negative voltage line Lo1−, a connection unit CN32 that connects the neuron $NR_{i3}$ to the neuron $NR_{i2}$ is formed by the positive voltage line Li3+, the negative voltage line Li3−, the positive voltage line Lo2+, and the negative voltage line Lo2−, and a connection unit CN33 that connects the neuron $NR_{i3}$ to the neuron $NR_{o3}$ is formed by the positive voltage line Li3+, the negative voltage line Li3−, the positive voltage line Lo3+, and the negative voltage line Lo3−. $I_n$ addition, a connection unit CN41 that connects the neuron $NR_{i4}$ to the neuron $NR_{o1}$ is formed by the positive voltage line Li4+, the negative voltage line Li4−, the positive voltage line Lo1+, and the negative voltage line Lo1−, a connection unit CN42 that connects the neuron $NR_{i4}$ to the neuron $NR_{i2}$ is formed by the positive voltage line Li4+, the negative voltage line Li4−, the positive voltage line Lo2+, and the negative voltage line Lo2−, and a connection unit CN43 that connects the neuron $NR_{i4}$ to the neuron $NR_{o3}$ is formed by the positive voltage line Li4+, the negative voltage line Li4−, the positive voltage line Lo3+, and the negative voltage line Lo3−. Note that, in the following description, when what is common to the aforementioned connection units CN11 to CN13, the aforementioned connection units CN21 to CN23, the aforementioned connection units CN31 to CN33, and the aforementioned connection units CN41 to CN43 is described, they are simply referred to as a "connection unit CN". Then, in each connection unit CN, only either of the positive voltage lines (for example, the positive voltage lines Li1+ and Lo1+, and the same applies hereinafter) or either of the negative voltage lines (for example, the negative voltage lines Li1− and Lo1−, and the same applies hereinafter) are connected by a resistance element having the resistance value corresponding to the aforementioned weighting coefficient W corresponding to itself.

Then, in the neural network circuit SS according to the first embodiment shown in FIG. 3(b), it is predetermined which voltage lines included in each connection unit CN are to be connected by the aforementioned resistance element so that the number of the connection unit CN11 and the like at which the positive voltage lines are connected each other is the same as the number of the connection unit CN13 and the like at which the negative voltage lines are connected each other in the entire neural network circuit SS and, in addition, that the connection unit CN11 and the like at which the positive voltage lines are connected each other and the connection unit CN13 and the like at which the negative voltage lines are connected each other are distributed uniformly and randomly (that is, at random) in the entire neural network circuit SS. This is because the inventors of the present application have found, from their study, that similar performance to the conventional one is secured in the learning function and the generalization function of the entire neural network circuit SS, as long as the number of the connection unit CN11 and the like at which the positive voltage lines are connected each other is the same as the number of the connection unit CN11 and the like at which the negative voltage lines are connected each other in the entire neural network circuit SS, and, in addition, they are uniformly randomly distributed in the entire neural network circuit SS although only either the positive voltage lines or the negative voltage lines are connected by the resistance element at each connection unit CN11 or the like. Here, the aforementioned generalization function means a function for correctly classifying unlearned input data $I_n$. Note that, the connection unit (e.g., CN11) at which only the positive voltage lines are connected each other is equivalent to an example of "positive-dedicated connection units" according to the present invention, and the connection unit (e.g., CN13) at which only the negative voltage lines are connected each other are equivalent to an example of "negative-dedicated connection units" according to the present invention.

Here, in the neural network circuit SS according to the first embodiment exemplified in FIG. 3(b), only the positive voltage line Li1+ and the positive voltage line Lo1+ are connected by a resistance element R1 at the connection unit CN11, and the resistance value of the resistance element R1 corresponds to the aforementioned positive weighting coefficient W when the neuron $NR_{i1}$ and the neuron $NR_{o1}$ are connected. Note that, the specific connection mode of the positive voltage line Li1+ and the positive voltage line Lo1+ by the resistance element R1 is basically the same as the connection mode of voltage lines using a variable resistance element shown in, for example, FIG. 1 or 3 of the aforementioned Patent Document 1 (the same applies to each connection unit CN below). $I_n$ addition, at the connection unit CN12, only the positive voltage line Li1+ and the positive voltage line Lo2+ are connected by a resistance element R5, and the resistance value of the resistance element R5 corresponds to the aforementioned positive weighting coefficient W when the neuron $NR_{i1}$ and the neuron $NR_{i2}$ are connected. $I_n$ addition, at the connection unit CN13, only the negative voltage line Li1− and the negative voltage line Lo3− are connected by a resistance element R9, and the resistance value of the resistance element R9 corresponds to the aforementioned negative weighting coefficient W when the neuron $NR_{i1}$ and the neuron $NR_{o3}$ are connected. Further, at the connection unit CN21, only the negative voltage line Li2− and the negative voltage line Lo1− are connected by a resistance element R2, and the resistance value of the resistance element R2 corresponds to the aforementioned negative weighting coefficient W when the neuron $NR_{i2}$ and the neuron $NR_{o1}$ are connected. $I_n$ addition, at the connection unit CN22, only the positive voltage line Li2+ and the positive voltage line Lo2+ are connected by a resistance element R6, and the resistance value of the resistance element R6 corresponds to the aforementioned positive weighting coefficient W when the neuron $NR_{i2}$ and the neuron $NR_{i2}$ are connected. $I_n$ addition, at the connection unit CN23, only the positive voltage line Li2+ and the positive voltage line Lo3+ are connected by a resistance element R10, and the resistance value of the resistance element R10 corresponds to the aforementioned positive weighting coefficient W when the neuron $NR_{i2}$ and the neuron $NR_{o3}$ are connected.

Further, at the connection unit CN31, only the positive voltage line Li3+ and the positive voltage line Lo1+ are connected by a resistance element R3, and the resistance value of the resistance element R3 corresponds to the aforementioned positive weighting coefficient W when the neuron $NR_{i3}$ and the neuron $NR_{o1}$ are connected. $I_n$ addition, at the connection unit CN32, only the negative voltage line Li3− and the negative voltage line Lo2− are connected by a resistance element R7, and the resistance value of the resistance element R7 corresponds to the aforementioned negative weighting coefficient W when the neuron $NR_{i3}$ and the neuron $NR_{i2}$ are connected. $I_n$ addition, at the connection unit CN33, only the positive voltage line Li3+ and the positive voltage line Lo3+ are connected by a resistance element R11, and the resistance value of the resistance element R11 corresponds to the aforementioned positive weighting coefficient W when the neuron $NR_{i3}$ and the neuron $NR_{o3}$ are connected. $I_n$ addition, at the connection unit CN41, only the negative voltage line Li4− and the negative voltage line Lo1− are connected by a resistance element R4, and the resistance value of the resistance element R4 corresponds to the aforementioned negative weighting coefficient W when the neuron $NR_{i4}$ and the neuron $NR_{o1}$ are connected. Further, at the connection unit CN42, only the negative voltage line Li4− and the negative voltage line Lo2− are connected by a resistance element R8, and the resistance value of the resistance element R8 corresponds to the aforementioned negative weighting coefficient W when the neuron $NR_{i4}$ and the neuron $NR_{i2}$ are connected. Lastly, at the connection unit CN43, only the negative voltage line Li4− and the negative voltage line Lo3− are connected by a resistance element R12, and the resistance value of the resistance element R12 corresponds to the aforementioned negative weighting coefficient W when the neuron $NR_{i4}$ and the neuron $NR_{o3}$ are connected.

As described above, the configuration of the neural network circuit SS according to the first embodiment comprises the input-side neurons $NR_{i1}$ to $NR_{i4}$, the output-side neurons $NR_{o1}$ to $NR_{o3}$, the connection units CN, and the self-learning control unit C, and each control unit CN is constituted by the connection unit CN11 and the like at which only the positive voltage lines are connected each other, and the connection unit CN13 and the like at which only the negative voltage lines are connected each other. Thus, it is possible to significantly reduce the area occupied by the connection units CN in the neural network circuit SS.

$I_n$ addition, since the number of the connection unit CN11 and the like at which the only positive voltage lines are connected each other is the same as the number of the connection unit CN13 and the like at which only the negative voltage lines are connected each other, it is possible to significantly reduce the area occupied by the connection units CN while the learning capability as the neural network circuit SS is improved.

Furthermore, since the connection unit CN11 and the like at which only the positive voltage lines are connected each other and the connection unit CN13 and the like at which only the negative voltage lines are connected each other are uniformly randomly distributed, it is possible to significantly reduce the area occupied by the connection units CN while similar learning capability and generalization capability to the conventional ones are maintained.

(C) Regarding Learning Effects and the Like with the Configuration of the Neural Network Circuit According to the First Embodiment Next, learning effects and the like with the configuration of the neural network circuit SS according to the first embodiment studied by the inventors of the present application will be described as the following (a) to (c).

(a) The inventors of the present application produced, using the configuration of the neural network circuit SS according to the first embodiment, a one-layered autoencoder including a neural network circuit SS having 784 input-side neurons NR and 293 output-side neurons NR, and conducted experiments on recognition of handwritten numerals. As the result, the pattern overlap (i.e., the restoration rate of the numeric patterns learned by the aforementioned autoencoder) was about 91% (more specifically, 91.4% (the value when the number of the input-side neurons NR was 784, the number of the output-side neurons NR was 293, and a weighting coefficient of 30% was randomly updated by the perceptron learning rule)). This restoration rate was not different from, for example, the restoration rate with the conventional method (91.1%) using the technique described in the aforementioned Patent Document 1.

(b) Further, the inventors of the present application produced a two-dimensional convolutional encoder using the configuration of the neural network circuit SS according to the first embodiment, and conducted similar experiments. As the result, the pattern overlap was about 97% (more specifically, 97.0% (the value when each number of the input-side neurons NR and the output-side neurons NR was 784, the convolution stride was 1, and a weighting coefficient of 30% was randomly updated by the perceptron learning rule)). This restoration rate was higher than the restoration rate with the conventional method (91.4%).

(c) The inventors of the present application conducted experiments for further multilayering, and finally conducted similar experiments with the addition of a three-layered back propagation algorithm. As the result, the pattern overlap was about 91% in each layer number. Thus, they confirmed that high functionality would be expected as long as sufficient time was spent for learning.

(II) Second Embodiment

Figure 4:
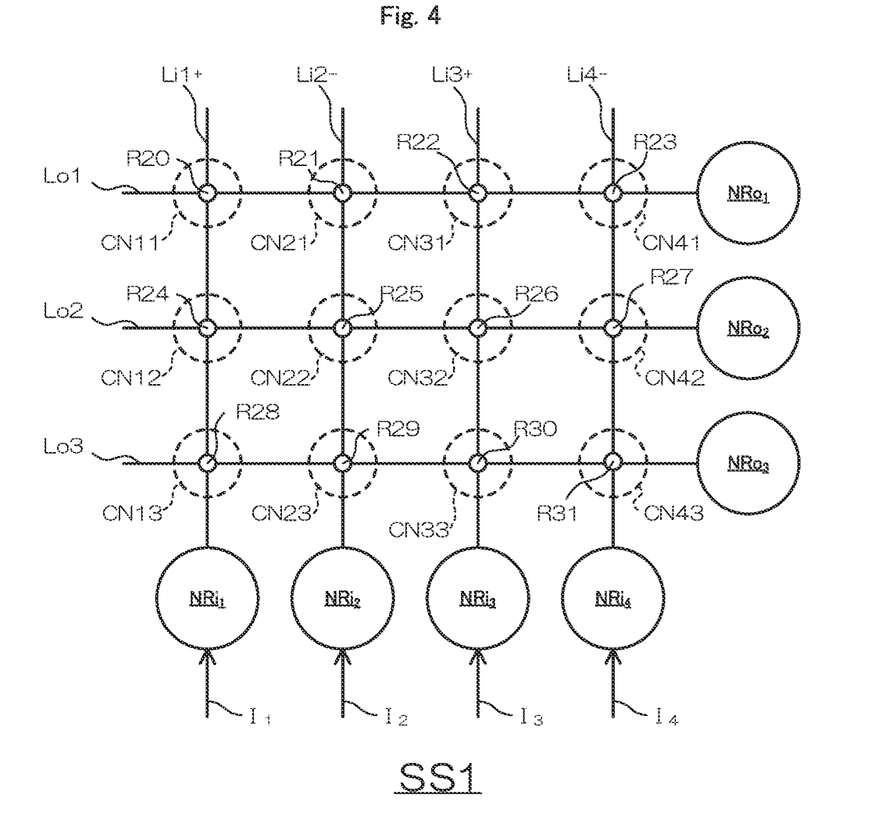
FIG. 4 is a figure indicating a neural network circuit according to a second embodiment.

Next, a second embodiment which is another embodiment of the present invention will be described with reference to FIG. 4. FIG. 4 is a figure indicating a neural network circuit according to the second embodiment. $I_n$ FIG. 4, the same components as those of the neural network circuit SS according to the first embodiment are denoted by the same component numbers, and detailed description thereof is omitted.

As shown in FIG. 4, a neural network circuit SS1 according to the second embodiment comprises positive voltage lines Li1+ and Li3+, negative voltage lines Li2− and Li4−, and voltage lines Lo1 to Lo3. The positive voltage lines Li1+ and Li3+ are connected to input-side neurons $NR_{i1}$ and $NR_{i3}$ respectively, and positive voltages corresponding to input data $I_1$ and input data $I_3$ are applied to the positive voltage lines Li1+ and Li3+ respectively. The negative voltage lines Li2− and Li4− are connected to input-side neurons $NR_{i2}$ and $NR_{i4}$ respectively, and negative voltages corresponding to input data $I_2$ and input data $I_4$ are applied to the negative voltage lines Li2− and Li4−. The voltage lines Lo1 to Lo3 are connected to output-side neurons $NR_{o1}$ to $NR_{o3}$ respectively. At this time, the positive voltage lines Li1+ and Li3+, the negative voltage lines Li2− and e Li4−, and the voltage lines Lo1 to Lo3 are formed in respective separate layers with, for example, aforementioned photolithography.

A connection unit CN11 that connects the neuron $NR_{i1}$ to the neuron $NR_{o1}$ is formed by the positive voltage line Li1+ and the voltage line Lo1, a connection unit CN12 that connects the neuron $NR_{i1}$ to the neuron $NR_{i2}$ is formed by the positive voltage line Li1+ and the voltage line Lo2, and a connection unit CN13 that connects the neuron $NR_{i1}$ to the neuron $NR_{o3}$ is formed by the positive voltage line Li1+ and the voltage line Lo3. $I_n$ addition, a connection unit CN21 that connects the neuron $NR_{i2}$ to the neuron $NR_{o1}$ is formed by the negative voltage line Li2− and the voltage line Lo1, a connection unit CN22 that connects the neuron $NR_{i2}$ to the neuron $NR_{i2}$ is formed by the negative voltage line Li2− and the voltage line Lo2, and a connection unit CN23 that connects the neuron $NR_{i2}$ to the neuron $NR_{o3}$ is formed by the negative voltage line Li2− and the voltage line Lo3. Further, a connection unit CN31 that connects the neuron $NR_{i3}$ to the neuron $NR_{o1}$ is formed by the positive voltage line Li3+ and the voltage line Lo1, a connection unit CN32 that connects the neuron $NR_{i3}$ to the neuron $NR_{i2}$ is formed by the positive voltage line Li3+ and the voltage line Lo2, and a connection unit CN33 that connects the neuron $NR_{i3}$ to the neuron $NR_{o3}$ is formed by the positive voltage line Li3+ and the voltage line Lo3. Further, a connection unit CN41 that connects the neuron $NR_{i4}$ to the neuron $NR_{o1}$ is formed by the negative voltage line Li4− and the voltage line Lo1, a connection unit CN42 that connects the neuron $NR_{i4}$ to the neuron $NR_{o2}$ is formed by the negative voltage line Li4− and the voltage line Lo2, and a connection unit CN43 that connects the neuron $NR_{i4}$ to the neuron $NR_{o3}$ is formed by the negative voltage line Li4− and the voltage line Lo3. Then, in each connection unit CN, the voltage lines constituting its connection unit CN are connected each other by a resistance element having the resistance value corresponding to the aforementioned weighting coefficient W as its connection unit CN.

Then, in the neural network circuit SS1 according to the second embodiment shown in FIG. 4, it is predetermined that the number of the connection units CN at which the positive voltage lines Li1+ and Li3+ are connected to the voltage lines Lo1 to Lo3 is to be the same as the number of the connection units CN at which the negative voltage lines Li2− and Li4− are connected to the voltage lines Lo1 to Lo3 in the entire neural network circuit SS1 and, in addition, that the connection units CN at which the positive voltage lines Li1+ and Li3+ are connected to the voltage lines Lo1 to Lo3, and the connection units CN at which the negative voltage lines Li2− and Li4− are connected to the voltage lines Lo1 to Lo3 are regularly distributed in the entire neural network circuit SS1. This is because the inventors of the present application have found, from their study, that similar performance to the conventional one is secured in the learning function of the entire neural network circuit SS1, as long as the number of the connection unit CN11 and the like at which the positive voltage lines are connected to the voltage line Lo1 and the like each other are the same as the number of the connection units CN21 at which the negative voltage lines are connected to the voltage line Lo1 and the like each other in the entire neural network circuit SS1, and, in addition, they are regularly distributed in the entire neural network circuit SS1 although only either the positive voltage lines or the negative voltage lines are connected to the voltage line Lo1 and the like by the resistance elements at each connection unit CN.

Here, in the neural network circuit SS1 according to the second embodiment exemplified in FIG. 4, the positive voltage line Li1+ and the voltage line Lo1 are connected by a resistance element R20 at the connection unit CN11, and the resistance value of the resistance element R20 corresponds to the aforementioned positive weighting coefficient W when the neuron $NR_{i1}$ and the neuron $NR_{o1}$ are connected. $I_n$ addition, at the connection unit CN12, the positive voltage line Li1+ and the voltage line Lo2 are connected by a resistance element R24, and the resistance value of the resistance element R24 corresponds to the aforementioned positive weighting coefficient W when the neuron $NR_{i1}$ and the neuron $NR_{i2}$ are connected. $I_n$ addition, at the connection unit CN13, the positive voltage line Li1+ and the voltage line Lo3 are connected by a resistance element R28, and the resistance value of the resistance element R28 corresponds to the aforementioned positive weighting coefficient W when the neuron $NR_{i1}$ and the neuron $NR_{o3}$ are connected. $I_n$ addition, at the connection unit CN21, the negative voltage line Li2− and the voltage line Lo1 are connected by a resistance element R21, and the resistance value of the resistance element R21 corresponds to the aforementioned negative weighting coefficient W when the neuron $NR_{i2}$ and the neuron $NR_{o1}$ are connected. $I_n$ addition, at the connection unit CN22, the negative voltage line Li2− and the voltage line Lo2 are connected by a resistance element R25, and the resistance value of the resistance element R25 corresponds to the aforementioned negative weighting coefficient W when the neuron $NR_{i2}$ and the neuron $NR_{i2}$ are connected. $I_n$ addition, at the connection unit CN23, the negative voltage line Li2− and the voltage line Lo3 are connected by a resistance element R29, and the resistance value of the resistance element R29 corresponds to the aforementioned negative weighting coefficient W when the neuron $NR_{i2}$ and the neuron $NR_{o3}$ are connected.

Further, at the connection unit CN31, the positive voltage line Li3+ and the voltage line Lo1 are connected by a resistance element R22, and the resistance value of the resistance element R22 corresponds to the aforementioned positive weighting coefficient W when the neuron $NR_{i3}$ and the neuron $NR_{o1}$ are connected. $I_n$ addition, at the connection unit CN32, the positive voltage line Li3+ and the voltage line Lo2 are connected by a resistance element R26, and the resistance value of the resistance element R26 corresponds to the aforementioned positive weighting coefficient W when the neuron $NR_{i3}$ and the neuron $NR_{i2}$ are connected. $I_n$ addition, at the connection unit CN33, the positive voltage line Li3+ and the voltage line Lo3 are connected by a resistance element R30, and the resistance value of the resistance element R30 corresponds to the aforementioned positive weighting coefficient W when the neuron $NR_{i3}$ and the neuron $NR_{o3}$ are connected. $I_n$ addition, at the connection unit CN41, the negative voltage line Li4− and the voltage line Lo1 are connected by a resistance element R23, and the resistance value of the resistance element R23 corresponds to the aforementioned negative weighting coefficient W when the neuron $NR_{i4}$ and the neuron $NR_{o1}$ are connected. $I_n$ addition, at the connection unit CN42, the negative voltage line Li4− and the voltage line Lo2 are connected by a resistance element R27, and the resistance value of the resistance element R27 corresponds to the aforementioned negative weighting coefficient W when the neuron $NR_{i4}$ and the neuron $NR_{i2}$ are connected. Lastly, at the connection unit CN43, the negative voltage line Li4− and the voltage line Lo3 are connected by a resistance element R31, and the resistance value of the resistance element R31 corresponds to the aforementioned negative weighting coefficient W when the neuron $NR_{i4}$ and the neuron $NR_{o3}$ are connected.

As described above, the configuration of the neural network circuit SS1 according to the second embodiment comprises the input-side neurons $NR_{i1}$ to $NR_{i4}$, the output-side neurons $NR_{o1}$ to $NR_{o3}$, the connection units CN, and the self-learning control unit C, and each control unit CN is constituted by the connection unit CN11 and the like at which the positive voltage lines are connected, and the connection unit CN21 and the like at which the negative voltage lines are connected. Thus, it is possible to significantly reduce the area occupied by the connection units CN in the neural network circuit SS1.

In addition, since the number of the connection unit CN11 and the like at which the positive voltage lines are connected is the same as the number of the connection unit CN21 and the like at which the negative voltage lines are connected, it is possible to significantly reduce the area occupied by the connection units CN while the learning capability as the neural network circuit SS1 is improved.

Furthermore, since the connection unit CN11 and the like at which the positive voltage lines are connected and the connection unit CN21 and the like at which the negative voltage lines are connected are regularly distributed, it is possible to significantly reduce the area occupied by the connection units CN while similar learning capability to the conventional one is maintained.

INDUSTRIAL APPLICABILITY

As described above, the present invention can be used in the field of a neural network circuit, and a remarkable effect can be obtained particularly when the present invention is applied to the field of a learning apparatus including the neural network circuit.

DESCRIPTION OF REFERENCE NUMERALS

C Self-learning control unit
SS, SS1 Neural network circuit
$I_1, I_2, I_n$ Input data
NR, $NR_{i1}, NR_{i2}, NR_{i3}, NR_{i4}, NR_{o1}, NR_{o2}, NR_{o3}$ Neuron
$W_1, W_2, W_n$ Weighting coefficient
$O, O_1, O_2, O_3$ Output data
NW Neural network
Li1+, Li2+, Li3+, Li4+, Lo1+, Lo2+, Lo3+ Positive voltage line
Li1−, Li2−, Li3−, Li4−, Lo1−, Lo2−, Lo3− Negative voltage line
Lo1, Lo2, Lo3 Voltage line
CN11, CN12, CN13, CN21, CN22, CN23, CN31, CN32, CN33, CN41,
CN42, CN43 Connection unit
R1, R2, R3, R4, R5, R6, R7, R8, R9, R10, R11, R12, R20, R21, R22, R23, R24, R25, R26, R27, R28, R29, R30, R31 Resistance element

The invention claimed is:

1. A fixed-weighting-sign learning apparatus comprising:
an analog-type neural network circuit that models a brain function, wherein
the neural network circuit comprises:
a plurality of (n) input units each configured to receive an input signal equivalent to input data, wherein each of the input units is connected to one of input positive voltage lines and one of input negative voltage lines;
a plurality of (m, and n=m is included) output units each configured to output an output signal equivalent to output data, wherein each of the output units is connected to one of output positive voltage lines and one of output negative voltage lines; and
(n×m) connection units each configured to connect one of the input units to one of the output units,
the neural network circuit models the brain function by applying positive weighting and negative weighting on the input data,
the fixed-weighting-sign learning apparatus is configured to perform a self-learning function in a manner such that data output from the input units, as a result of re-inputting the output data to the fixed-weighting-sign learning apparatus from the output units, matches the input data, and
the (n×m) connection units comprise positive-dedicated connection units and negative-dedicated connection units,
the positive-dedicated connection units are connection units at which only an input positive voltage line connected with one of the input units and an output positive voltage line connected with one of the output units are connected to each other via a resistance element, which has a resistance value corresponding to a positive weighting coefficient used in applying the positive weighting in modeling the brain function; and
the negative-dedicated connection units are connection units at which only an input negative voltage line connected with one of the input units and an input negative voltage line connected with one of the output units are connected to each other via a resistance element, which has a resistance value corresponding to a negative weighting coefficient used in applying the negative weighting in modeling the brain function.

2. The fixed-weighting-sign learning apparatus according to claim 1, wherein a number of the positive-dedicated connection units is equal to a number of the negative-dedicated connection units.

3. The fixed-weighting-sign learning apparatus according to claim 1, wherein the positive-dedicated connection units and the negative-dedicated connection units are uniformly randomly distributed in the (n×m) connection units.

4. The fixed-weighting-sign learning apparatus according to claim 1, wherein the positive-dedicated connection units and the negative-dedicated connection units are regularly distributed in the (n×m) connection units.

* * * * *